(12) United States Patent
Zhang et al.

(10) Patent No.: US 11,315,591 B2
(45) Date of Patent: Apr. 26, 2022

(54) VOICE ACTIVITY DETECTION METHOD

(71) Applicant: AMLOGIC (SHANGHAI) CO., LTD., Shanghai (CN)

(72) Inventors: Jinhong Zhang, Shanghai (CN); Jiye Ye, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 230 days.

(21) Appl. No.: 16/719,453

(22) Filed: Dec. 18, 2019

(65) Prior Publication Data

US 2020/0202890 A1 Jun. 25, 2020

(30) Foreign Application Priority Data

Dec. 19, 2018 (CN) .......................... 201811552320.2

(51) Int. Cl.
*G10L 25/78* (2013.01)
*G10L 15/22* (2006.01)
(Continued)

(52) U.S. Cl.
CPC .............. *G10L 25/78* (2013.01); *G10L 15/22* (2013.01); *G10L 21/0364* (2013.01); *G10L 25/21* (2013.01); *G10L 25/24* (2013.01)

(58) Field of Classification Search
CPC ...................................................... G10L 25/78
See application file for complete search history.

(56) References Cited

U.S. PATENT DOCUMENTS

2002/0188442 A1* 12/2002 Gass ........................ G10L 25/78
704/208
2004/0125962 A1* 7/2004 Christoph .............. H03G 5/005
381/59
(Continued)

FOREIGN PATENT DOCUMENTS

| CN | 105261368 A | 1/2016 |
| CN | 107919116 A | 4/2018 |
| CN | 107945793 A | 4/2018 |

OTHER PUBLICATIONS

Dubey et al., "Leveraging Frequency-Dependent Kernel and DIP-Based Clustering for Robust Speech Activity Detection in Naturalistic Audio Streams." IEEE/ACM Transactions on Audio, Speech, and Language Processing 26 (2018): 2056-2071 (Year: 2018).*

(Continued)

*Primary Examiner* — Samuel G Neway
(74) *Attorney, Agent, or Firm* — Procopio, Cory, Hargreaves & Savitch LLP (57) ABSTRACT

The present invention relates to the field of voice activity detection technologies, and more particularly, to a voice activity detection method. The method comprises: providing an acquisition unit for acquiring an external sound signal; providing a judgment unit for judging whether the sound signal is a voice signal; if the sound signal is a voice signal, starting a voice processing unit for processing the sound signal; if the sound signal is not a voice signal, the voice processing unit is kept in a sleep state. With the voice activity detection method, the voice processing unit with large power consumption is made to be in a sleep state for a long time, and therefore, the entire system can be kept in a low-power consumption state; the voice activity detection method is low in implementation cost and can obtain better performance with a small amount of calculation and less resource consumption.

15 Claims, 3 Drawing Sheets

(51) Int. Cl.
*G10L 25/21* (2013.01)
*G10L 25/24* (2013.01)
*G10L 21/0364* (2013.01)

(56) References Cited

U.S. PATENT DOCUMENTS

| | | | | |
|---|---|---|---|---|
| 2011/0035213 | A1* | 2/2011 | Malenovsky | G10L 25/78 |
| | | | | 704/208 |
| 2011/0251845 | A1* | 10/2011 | Arakawa | G10L 25/78 |
| | | | | 704/270 |
| 2014/0122078 | A1* | 5/2014 | Joshi | G06F 1/3206 |
| | | | | 704/251 |
| 2014/0270260 | A1* | 9/2014 | Goertz | G10L 15/22 |
| | | | | 381/110 |
| 2015/0039304 | A1* | 2/2015 | Wein | G10L 25/78 |
| | | | | 704/233 |
| 2015/0350774 | A1* | 12/2015 | Furst | G06F 1/325 |
| | | | | 381/110 |
| 2015/0372723 | A1* | 12/2015 | Gao | G10L 21/0232 |
| | | | | 704/205 |
| 2016/0155456 | A1* | 6/2016 | Wang | G10L 19/12 |
| | | | | 704/208 |
| 2017/0133023 | A1* | 5/2017 | Disch | G10L 19/022 |
| 2017/0133041 | A1* | 5/2017 | Mortensen | G10L 25/15 |
| 2019/0341067 | A1* | 11/2019 | Rajendran | G10L 25/12 |
| 2020/0184996 | A1* | 6/2020 | Steele | H04R 1/1016 |
| 2020/0202890 | A1* | 6/2020 | Zhang | G10L 15/22 |

OTHER PUBLICATIONS

Graf et al., "Features for voice activity detection: a comparative analysis", EURASIP J. Adv. Signal Process. 2015, 91 (2015) (Year: 2015).*

* cited by examiner

VOICE ACTIVITY DETECTION METHOD

CROSS-REFERENCE TO RELATED APPLICATIONS

The present application claims priority to and the benefit of Chinese Patent Application No. CN 201811552320.2 filed on Dec. 19, 2018, the entire content of which is incorporated herein by reference.

BACKGROUND OF THE INVENTION

1. Field of the Invention

The invention relates to the field of voice activity detection technologies, and more particularly, to a voice activity detection method.

2. Description of the Related Art

Voice activity detection (VAD) is used to detect the presence of a voice signal in the current sound signal, that is, to judge an input signal, differentiating the voice signal from a background noise signal, using two different respective processing methods to the two signals. VAD is a basic step in the digital voice signal processing. In practice, voice signal detection is and must be the first step in most application systems, whereby data to be processed later is valid voice signal data, so that data amount and calculation amount is reduced, and processing time of the system is reduced.

Figure 1:
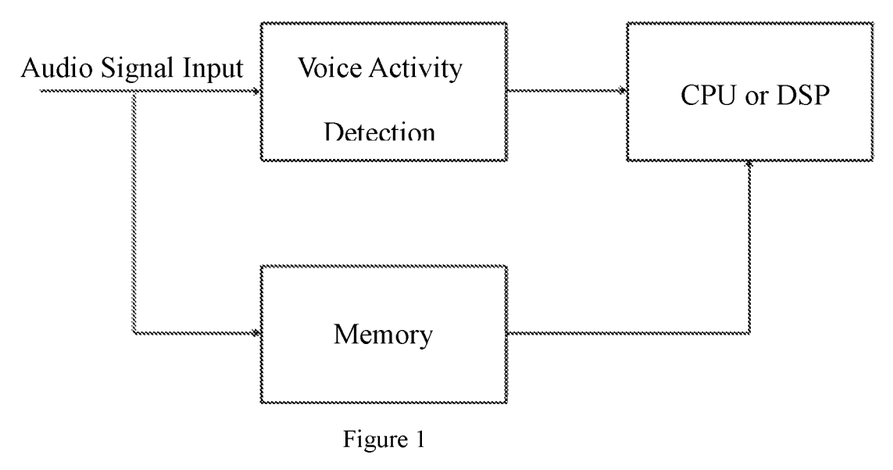
FIG. 1 is a functional block diagram of a voice activity detection method in the prior art.

As shown in FIG. 1, conventional voice activity detection may detect whether all the sound is voice. Typically, the existing voice activity detection is carried out in two ways, one is a traditional signal processing method based on power, time domain and frequency domain; the other is the popular detection method based on the neural network. For the popular one, neural network algorithm has good performance, but has a large amount of calculation, that is, it usually takes several million of calculation to complete the processing of a signal of each frame. Also, due to the fact that the storage of the neural network weight requires several M bytes, a lot of resources are involved in the implementation of hardware, which results in a high implementation cost. Therefore, such a method is not applicable to a scenario where low power consumption and low cost are expected. In addition, power consumption is large when the neural network VAD algorithm is implemented on CPU (Central Processing Unit) or DSP (Digital Signal Processor).

With the development of voice recognition technology, it is therefore in urgent need of proper voice activity detection. Only when voice is detected can the voice recognition processing be started, such that the requirement of the system being kept in a low-power consumption state while in standby can be met.

SUMMARY OF THE INVENTION

Given that the foregoing problems exist in the prior art, the present invention provides a voice activity detection method.

The technical solutions are as follows:

A voice activity detection method, comprising:
providing an acquisition unit for acquiring an external sound signal;
providing a judgment unit for judging whether the sound signal is a voice signal;
if the sound signal is a voice signal, starting a voice processing unit for processing the sound signal;
if the sound signal is not a voice signal, the voice processing unit is kept in a sleep state.

Preferably, providing judgment unit for judging whether the sound signal is a voice signal comprises the steps of:

Step S1, reducing a sampling frequency of the sound signal to obtain a first processing signal;

Step S2, performing a high-pass filtering on the first processing signal, to obtain a second processing signal;

Step S3, framing the second processing signal at a preset time interval;

Step S4, detecting the framed second processing signal for obtaining a detection result that whether the sound signal is the voice signal;

processing the detection result into an activation signal and outputting the activation signal to the voice processing unit.

Preferably, detecting the framed second processing signal comprises performing a power detection on the framed second processing signal, to output a power detection result with a Boolean sequence as the detection result.

Preferably, detecting the framed second processing signal comprises performing entropy detection on the framed second processing signal, to output an entropy detection result with a Boolean sequence as the detection result.

Preferably, detecting the framed second processing signal comprises, performing a cepstrum detection on the framed second processing signal, to output a cepstrum detection result with a Boolean sequence as the detection result.

Preferably, detecting the framed second processing signal comprises:

performing a power detection on the framed second processing signal to output a power detection result with a Boolean sequence, using the power detection result as an enable signal performing an entropy detection on the framed second processing signal, outputting an entropy detection result with a Boolean sequence after the entropy detection as the detection result; or synchronously performing the power detection and the entropy detection on the framed second processing signal, and synchronously obtaining the power detection result with a Boolean sequence and the entropy detection result with a Boolean sequence; making a decision on the power detection result and the entropy detection result by using a preset strategy to obtain a decision result; and outputting the decision result as the detection result.

Preferably, detecting the framed second processing signal comprises:

performing a power detection on the framed second processing signal to output a power detection result with a Boolean sequence, using the power detection result as an enable signal performing a cepstrum detection on the framed second processing signal, output a cepstrum detection result with a Boolean sequence after the cepstrum detection as the detection result; or synchronously performing the power detection and the cepstrum detection on the framed second processing signal, and synchronously obtaining the power detection result with a Boolean sequence and the cepstrum detection result with a Boolean sequence; making a decision on the power detection result and the cepstrum detection result by using a preset strategy to obtain a decision result; and outputting the decision result as the detection result.

Preferably, detecting the framed second processing signal comprises:

performing an entropy detection on the framed second processing signal to output an entropy detection result with a Boolean sequence, using the entropy detection result as an enable signal performing a cepstrum detection on the framed second processing signal, outputting a cepstrum detection result with a Boolean sequence after the cepstrum detection as the detection result; or synchronously performing the entropy detection and the cepstrum detection on the framed second processing signal, and synchronously obtaining the entropy detection result with a Boolean sequence and the cepstrum detection result with a Boolean sequence; making a decision on the entropy detection result and the cepstrum detection result by using a preset strategy to obtain a decision result; and outputting the decision result as the detection result.

Preferably, detecting the framed second processing signal comprises:

performing a power detection on the framed second processing signal to output a power detection result with a Boolean sequence, using the power detection result as an enable signal performing entropy detection on the framed second processing signal; using the entropy detection result as an enable signal performing cepstrum detection on the framed second processing signal, outputting a cepstrum detection result with a Boolean sequence after the cepstrum detection as the detection result; or synchronously performing the power detection, the entropy detection and the cepstrum detection on the framed second processing signal, and synchronously obtaining the power detection result with a Boolean sequence, the entropy detection result with a Boolean sequence and the cepstrum detection result with a Boolean sequence; making a decision on the power detection result, the entropy detection result and the cepstrum detection result by using a preset strategy to obtain a decision result; and outputting the decision result as the detection result.

Preferably, in Step S4, processing the detection result into the activation signal comprises smoothing each of frames of the detection result.

Preferably, in Step S3, the second processing signal is framed by the following formula:

$$\text{frame}(n,m) = y\_emp(f_s * t * n + m);$$

wherein frame(n,m) represents each of frames of the second processing signal after the framing operation;

y_emp represents the second processing signal;

$f_s$ represents the sampling frequency of the voice signal;

t represents the preset time interval;

n represents the $n^{th}$ frame; and m represents the $m^{th}$ point in the $n^{th}$ frame.

Preferably, the power detection result is performed by the following formula:

$$\text{flag\_pow}(n) = \begin{Bmatrix} 1 & avgPow(n) > avgPowold(n) * thresh1 \\ 0 & others \end{Bmatrix}$$

wherein flag_pow(n) represents the power detection result;

avgPow(n) represents an average power of a current frame;

avgPowOld(n) represents an average power of a previous frame; and thresh1 represents an adjusting parameter.

Preferably, a value of thresh1 is in a range from 3 to 100.

Preferably, the average power of the current frame is obtained by the following formula:

$$avgPow(n) = \sum_{m=0}^{framelen-1} abs(frame(n,m))^2; \text{ and/or}$$

$$avgPowOld(n) = \frac{1}{avglen} \sum_{i=1}^{avglen} avgPow(n-i);$$

Wherein frame(n,m) represents each of the frames of the second processing signal after the framing operation;

avgPow(n) represents an average power of a current frame;

framelen represents a length of each of the frames;

avgPowOld(n) represents an average power of a previous frame; and avglen represents the number of frames currently sampled.

Preferably, the entropy detection result is performed by the following formula:

$$\text{flag\_sen}(n) = \begin{Bmatrix} 1 & H(n) > thresh2 \\ 0 & others \end{Bmatrix};$$

wherein flag_sen(n) represents the entropy detection result;

H(n) represents an entropy function of the framed second processing signal; and thresh2 represents a threshold value of entropy judgment.

Preferably, a value of thresh2 is in a range from −7 to 0.

Preferably, the entropy function of the framed second processing signal is obtained by the following formula:

$$H(n) = \sum_{m=0}^{framelen-1} prob(n,m) * \log_2(prob(n,m)); \text{ and/or}$$

$$prob(n,m) = \frac{Ypow(n,m)}{\sum_{m=0}^{framelen-1} Ypow(n,m)};$$

$$Ypow(n,m) = abs(Y(n,m))^2;$$

$$Y(n,m) = FFT(xw(n,m));$$

$$xw(n,m) = frame(n,m) * win(m);$$

wherein

H(n) represents the entropy function of the framed second processing signal;

win(m) represents a window function;

xw(n,m) represents a signal obtained by windowing the framed second processing signal;

Y(n,m) represents a signal obtained by performing a fast Fourier transform on xw(n,m);

Ypow(n,m) represents a power spectrum of xw(n,m); and prob(n,m) represents the probability of Ypow(n,m).

Preferably, the cepstrum detection result is performed by the following formula:

$$\text{flag\_ceps}(n) = \begin{Bmatrix} 1 & tmax(n) - tmin(n) > thresh3 \\ 0 & others \end{Bmatrix};$$

-continued $t\max(n) = \max(ceps(n, speech\_range));$ $t\min(n) = \min(ceps(n, speech\_range));$ $ceps(n, m) = IFFT(Ypow\_log(n, m));$ $Ypow\_log(n, m) = \log_2(Ypow(n, m));$ wherein flag_ceps(n) represents the cepstrum detection result;

Ypow(n,m) represents a power spectrum of xw(n,m);

xw(n,m) represents a signal obtained by windowing the framed second processing signal;

Ypow_log(n,m) represents the cepstrum of xw(n,m);

ceps(n,m) represents a signal obtained by performing an inverse fast Fourier transform on Ypow_log(n,m);

t max(n) represents a maximum value of the current value of ceps(n,m) in a human speech output segment;

t min(n) represents a minimum value of the current value of ceps(n,m) in the human speech output segment;

speech_range represents a range of human speech output segment; and thresh3 represents a threshold value of the cepstrum judgment.

Preferably, a value of thresh3 is in a range from 0.5 to 1.5.

By adopting the above-mentioned technical solutions, the present invention has the following beneficial effects: a voice activity detection method is disclosed. First of all, a sound signal is acquired, and it is determined whether the sound signal is a voice signal; if the sound signal is a voice signal, a voice processing unit is started to process the sound signal; if the sound signal is not a voice signal, the voice processing unit is kept in a sleep state. With the voice activity detection method provided by the technical solutions of the present invention adopted, the voice processing unit with large power consumption is made to be in a sleep state for a long time, and therefore, the entire system can be kept in a low-power consumption state; the voice activity detection method is low in implementation cost and can obtain better performance with a small amount of calculation and less resource consumption.

BRIEF DESCRIPTION OF THE DRAWINGS

The accompanying drawings, together with the specification, illustrate exemplary embodiments of the present disclosure, and, together with the description, serve to explain the principles of the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

As shown in FIG. 1, conventional voice activity detection may detect whether all the sound is voice. Typically, the existing voice activity detection is carried out in two ways, one is a traditional signal processing method based on power, time domain and frequency domain; the other is a popular detection method based on the neural network. For the popular one, neural network algorithm has good performance, but has a large amount of calculation, that is, it usually takes several million of calculation to complete the processing of a signal of each frame. Also, due to the fact that the storage of the neural network weight requires several M bytes, a lot of resources are involved in the implementation of hardware, which results in a high implementation cost. Therefore, such a method is not applicable to a scenario where low power consumption and low cost are expected. In addition, power consumption is large when the neural network VAD algorithm is implemented on CPU (Central Processing Unit) or DSP (Digital Signal Processor).

With the development of voice recognition technology, it is therefore in urgent need of proper voice activity detection. Only when voice is detected can the voice recognition processing be started, such that the requirement of the system being kept in a low-power consumption state while in standby can be met.

Figure 2:
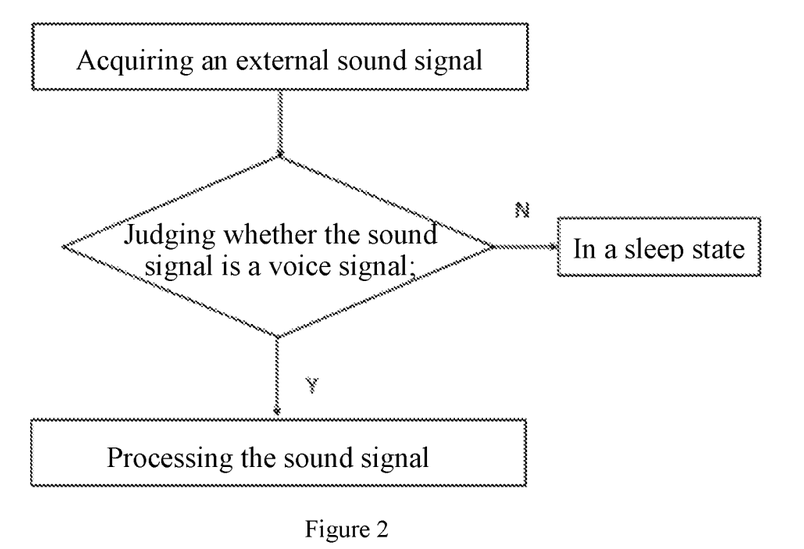
FIG. 2 is a flowchart illustrating steps of the voice activity detection method according to an embodiment of the present invention.

Given that the foregoing problems exist in the prior art, the present invention provides a voice activity detection method. As shown in FIG. 2, the method comprises:

providing an acquisition unit 1 for acquiring an external sound signal;

providing a judgment unit 2 for judging whether the sound signal is a voice signal;

if the sound signal is a voice signal, starting a voice processing unit 3 for processing the sound signal;

if the sound signal is not a voice signal, the voice processing unit 3 is kept in a sleep state.

Figure 3:
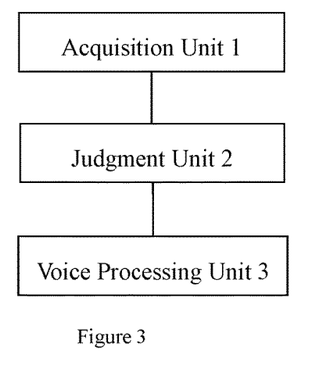
FIG. 3 is a functional block diagram of a voice activity detection method according to an embodiment of the present invention.

With the voice activity detection method provided by the technical solutions of the present invention adopted, a voice activity detection method is disclosed, and the method is applicable to a voice activity detection system. As shown in FIG. 3, the voice activity detection system comprises the acquisition unit 1, the judgment unit 2 and the voice processing unit 3, wherein the acquisition unit 1 is connected to the judgment unit 2, and the voice processing unit 3 is connected to the judgment unit 2.

First of all, the acquisition unit 1 is provided so as to acquire an external sound signal; the judgment unit 2 is provided so as to judge whether the sound signal is a voice signal; if the sound signal is a voice signal, the voice processing unit 3 is started to process the sound signal; if the sound signal is not a voice signal, the voice processing unit 3 is kept in a sleep state.

Furthermore, with the voice activity detection method provided by the technical solutions of the present invention adopted, the voice processing unit 3 with large power consumption is made to be in a sleep state for a long time, and therefore, the entire system can be kept in a low-power consumption state; the voice activity detection method is low in implementation cost and can obtain better performance with a small amount of calculation and less resource consumption.

In a preferred embodiment, providing judgment unit for judging whether the sound signal is a voice signal comprises the steps of:

Step S1, reducing a sampling frequency of the sound signal to obtain a first processing signal;

Step S2, performing a high-pass filtering on the first processing signal, to obtain a second processing signal y_emp;

Step S3, framing the second processing signal y_emp at a preset time interval;

Step S4, detecting the framed second processing signal y_emp for obtaining a detection result that whether the sound signal is the voice signal;

processing the detection result into an activation signal and outputting the activation signal to the voice processing unit.

Figure 4:
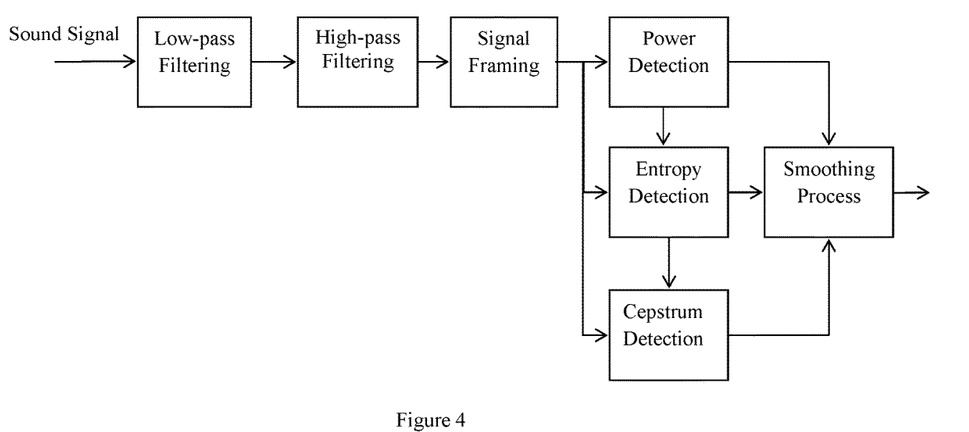
FIG. 4 is a functional block diagram illustrating how a judgment unit judges whether a sound signal is a voice signal in the voice activity detection method according to an embodiment of the present invention.
Figure 5:
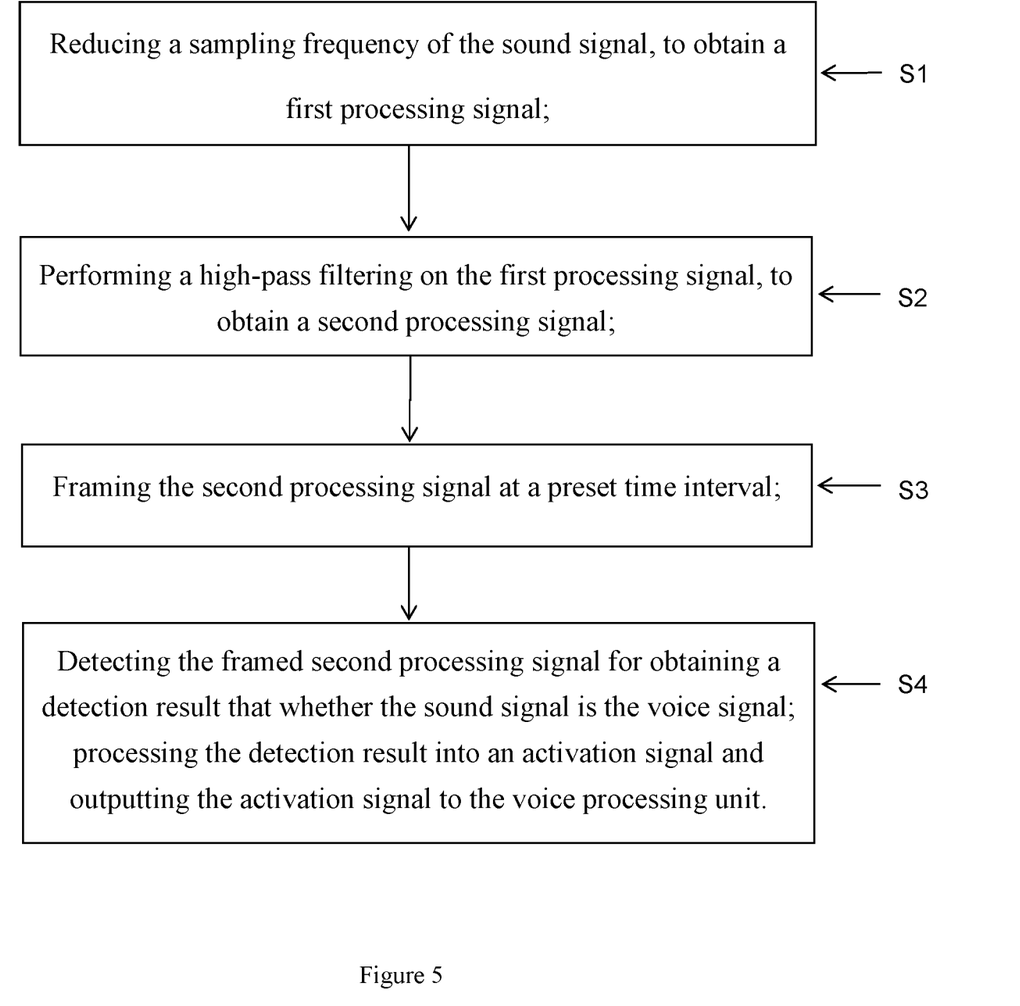
FIG. 5 is a flowchart illustrating a step of a judgment unit judging whether a sound signal is a voice signal in the voice activity detection method according to an embodiment of the present invention.

In the above-mentioned technical solutions, as shown in FIGS. 4 and 5, first of all, an input signal is subjected to low-pass filtering, and the sampling frequency is reduced to 8000 Hz, so as to obtain the first processing signal, then the first processing signal is passed through a high-pass filter. Preferably, the high-pass filter may be a pre-emphasis filter configured to perform high-pass filtering to obtain the second processing signal y_emp, and the second processing signal y_emp is framed at a preset time interval; wherein the preset time interval may be set to 10 ms, the frame length may be set to L ms, wherein, a value of L may be in a range from 20 to 32.

Furthermore, the framed second processing signal y_emp is detected to obtain a detection result that whether the sound signal is the voice signal, and the detection result is processed into an activation signal, and the activation signal is output to the voice processing unit. The step of processing the detection result into the activation signal further comprises smoothing each of frames of the detection result. It should be noted that the smoothing each of frames of the detection result can be done in various ways, for example, by using an algorithm for taking N from M, to avoid the smoothing of a signal from a previous frame. Therefore, a smoothing process with low cost and small power consumption is provided, the detection probability is reduced, and the probability of false alarm is greatly reduced.

Furthermore, with the voice activity detection method provided by the technical solutions of the present invention adopted, the voice processing unit 3 with large power consumption is made to be in a sleep state for a long time, and therefore, the entire system can be kept in a low-power consumption state; the voice activity detection method is low in implementation cost and can obtain better performance with a small amount of calculation and less resource consumption.

In a preferred embodiment, in Step S3, the second processing signal y_emp is framed by the following formula:

$$\text{frame}(n,m) = y\_emp(f_s * t * n + m);$$

wherein frame(n,m) represents each of frames of the second processing signal y_emp after the framing operation;

y_emp represents the second processing signal y_emp;

$f_s$ represents the sampling frequency of the voice signal;

t represents the preset time interval;

n represents the $n^{th}$ frame; and m represents the $m^{th}$ point in the $n^{th}$ frame.

In the above-mentioned technical solutions, length of each frame framelen=L*0.001*8000, therefore, a value of framelen is in a range from 160 to 256. Preferably, the second processing signal y_emp from each frame may be framed by the following formula: frame(n,m)=y_emp(80*n+m), wherein 80 represents 80 sampling points, that is $f_s$*t=8000*10 ms=80 sampling points.

Furthermore, the framed second processing signal y_emp is detected to obtain a detection result that whether the sound signal is the voice signal, and the detection result is processed into an activation signal, and the activation signal is output to the voice processing unit. Furthermore, with the voice activity detection method provided by the technical solutions of the present invention adopted, the voice processing unit 3 with large power consumption is made to be in a sleep state for a long time, and therefore, the entire system can be kept in a low-power consumption state; the voice activity detection method is low in implementation cost and can obtain better performance with a small amount of calculation and less resource consumption.

In a preferred embodiment, detecting the framed second processing signal y_emp comprises performing a power detection on the framed second processing signal y_emp to output a power detection result with a Boolean sequence as the detection result.

In the above-mentioned technical solution, the power detection result is performed by the following formula:

$$\text{flag\_pow}(n) = \begin{cases} 1 & avgPow(n) > avgPowold(n) * thresh1 \\ 0 & others \end{cases}$$

wherein flag_pow(n) represents the power detection result;

avgPow(n) represents an average power of a current frame;

avgPowOld(n) represents an average power of a previous frame; and thresh1 represents an adjusting parameter;

wherein, the average power of the current frame is obtained by the following formula:

$$avgPow(n) = \sum_{m=0}^{framelen-1} abs(frame(n,m))^2; \text{ and/or}$$

$$avgPowOld(n) = \frac{1}{avglen} \sum_{i=1}^{avglen} avgPow(n-i);$$

wherein frame(n,m) represents each of the frames of the second processing signal y_emp after the framing operation;

avgPow(n) represents an average power of a current frame;

framelen represents a length of each of the frames;

avgPowOld(n) represents an average power of a previous frame; and avglen represents the number of frames currently sampled.

In the above-mentioned technical solution, thresh1 represents the adjusting parameter, which may be configured depending on the specific application. In this embodiment, a value of thresh1 is in a range from 3 to 100. avglen represents the number of frames of forward sampling, it may be a configuration parameter, and its value is in a range from 4 to 32.

Furthermore, with the voice activity detection method provided by the technical solutions of the present invention adopted, the voice processing unit 3 with large power consumption is made to be in a sleep state for a long time, and therefore, the entire system can be kept in a low-power consumption state; the voice activity detection method is low in implementation cost and can obtain better performance with a small amount of calculation and less resource consumption.

In a preferred embodiment, the step of detecting the framed second processing signal y_emp comprises performing entropy detection on the framed second processing signal y_emp to output an entropy detection result with a Boolean sequence as the detection result.

In the above-mentioned technical solution, the entropy detection result is performed by the following formula:

$$flag\_sen(n) = \begin{Bmatrix} 1 & H(n) > thresh2 \\ 0 & others \end{Bmatrix};$$

wherein flag_sen(n) represents the entropy detection result;

H(n) represents an entropy function of the framed second processing signal y_emp; and thresh2 represents a threshold value of entropy judgment.

Preferably, a value of thresh2 is in a range from −7 to 0.

Preferably, the entropy function of the framed second processing signal y_emp is obtained by the following formula:

$$H(n) = \sum_{m=0}^{framelen-1} prob(n,m) * \log_2(prob(n,m)); \text{ and/or}$$

$$prob(n,m) = \frac{Ypow(n,m)}{\sum_{m=0}^{framelen-1} Ypow(n,m)};$$

$$Ypow(n,m) = abs(Y(n,m))^2;$$

$$Y(n,m) = FFT(xw(n,m));$$

$$xw(n,m) = frame(n,m) * win(m);$$

wherein

H(n) represents the entropy function of the framed second processing signal y_emp;

win(m) represents a window function;

xw(n,m) represents a signal obtained by windowing the framed second processing signal y_emp;

Y(n,m) represents a signal obtained by performing a fast Fourier transform on xw(n,m);

Ypow(n,m) represents a power spectrum of xw(n,m); and prob(n,m) represents the probability of Ypow(n,m).

Preferably, thresh2 represents a threshold value of entropy judgment, which may be configured depending on the specific application. In this embodiment, pre-configured entropy parameter thresh2 is in a range from −7 to 0. Windowing process is performed by a sampling method, and the window used in the windowing process is either a hamming window or a hanning window.

Furthermore, with the voice activity detection method provided by the technical solutions of the present invention adopted, the voice processing unit 3 with large power consumption is made to be in a sleep state for a long time, and therefore, the entire system can be kept in a low-power consumption state; the voice activity detection method is low in implementation cost and can obtain better performance with a small amount of calculation and less resource consumption.

In a preferred embodiment, the step of detecting the framed second processing signal y_emp comprises performing a cepstrum detection on the framed second processing signal y_emp, to output a cepstrum detection result with a Boolean sequence as the detection result.

In the above-mentioned technical solution, the cepstrum detection result is performed by the following formula:

$$flag\_ceps(n) = \begin{Bmatrix} 1 & tmax(n) - tmin(n) > thresh3 \\ 0 & others \end{Bmatrix};$$

$$tmax(n) - max(ceps(n, speech\_range));$$

$$tmin(n) - min(ceps(n, speech\_range));$$

$$ceps(n,m) = IFFT(Ypow\_log(n,m));$$

$$Ypow\_log(n,m) = \log_2(Ypow(n,m));$$

wherein flag_ceps(n) represents the cepstrum detection result;

Ypow(n,m) represents a power spectrum of xw(n,m);

xw(n,m) represents a signal obtained by windowing the framed second processing signal y_emp;

Ypow_log(n,m) represents the cepstrum of xw(n,m);

ceps(n,m) represents a signal obtained by performing an inverse fast Fourier transform on Ypow_log(n,m);

t max(n) represents a maximum value of the current value of ceps(n,m) in a human speech output segment;

t min(n) represents a minimum value of the current value of ceps(n,m) in the human speech output segment;

speech_range represents a range of the human speech output segment; and thresh3 represents a threshold value of the cepstrum judgment.

In particular, the current frame represents a frame currently being processed, and thresh3 represents a threshold value of cepstrum judgment, which is a configurable parameter. Preferably, in this embodiment, a value of thresh3 is in a range from 0.5 to 1.5. In addition, IFFT represents an Inverse Fast Fourier Transform. Preferably, length of each frame framelen is 256 points; if the length of each frame framelen is less than 256, the FFT input is zero-padded to 256 points. speech_range represents a range of the human speech output segment, preferably, the range is from 2.5 ms to 16 ms, and speech_range is in a range from 20 to 128.

Furthermore, with the voice activity detection method provided by the technical solutions of the present invention adopted, the voice processing unit 3 with large power consumption is made to be in a sleep state for a long time, and therefore, the entire system can be kept in a low-power consumption state; the voice activity detection method is low in implementation cost and can obtain better performance with a small amount of calculation and less resource consumption.

In a preferred embodiment, in order to improve the flexibility of the voice activity detection method, some flexible configurations can be made. For example, entropy detection and cepstrum detection are turned on or off simultaneously, and the results of entropy detection and cepstrum detection are subjected to the time-domain smoothing to make a decision. In addition, if it is desired to detect unvoiced sound, since the cepstrum of unvoiced sound has no peaks, but the entropy thereof is relatively large, the cepstrum detection may always be turned off, and only results of the power detection and the entropy detection are taken into consideration. In such a standby state, the calculation of the entropy detection and the cepstrum detection of power consumption will not be triggered, which ensures that the system runs with low power consumption.

The step of detecting the framed second processing signal further comprises:

Example 1 performing a power detection on the framed second processing signal y_emp to output a power detection result with a Boolean sequence, using the power detection result as an enable signal performing entropy detection on the framed second processing signal y_emp, output an entropy detection result with a Boolean sequence after the entropy detection as the detection result; or synchronously performing the power detection and the entropy detection on the framed second processing signal y_emp, and synchronously obtaining the power detection result with a Boolean sequence and the entropy detection result with a Boolean sequence; making a decision on the power detection result and the entropy detection result by using a preset strategy to obtain a decision result; and outputting the decision result as the detection result.

Example 2 performing a power detection on the framed second processing signal y_emp to output a power detection result with a Boolean sequence, using the power detection result as an enable signal performing a cepstrum detection on the framed second processing signal y_emp, output a cepstrum detection result with a Boolean sequence after the cepstrum detection as the detection result; or synchronously performing the power detection and the cepstrum detection on the framed second processing signal, and synchronously obtaining the power detection result with a Boolean sequence and the cepstrum detection result with a Boolean sequence; making a decision on the power detection result and the cepstrum detection result by using a preset strategy to obtain a decision result; and outputting the decision result as the detection result.

Example 3 performing an entropy detection on the framed second processing signal y_emp to output an entropy detection result with a Boolean sequence, using the entropy detection result as an enable signal performing a cepstrum detection on the framed second processing signal, outputting a cepstrum detection result with a Boolean sequence as the detection result; or synchronously performing the entropy detection and the cepstrum detection on the framed second processing signal y_emp, and synchronously obtaining the entropy detection result with a Boolean sequence and the cepstrum detection result with a Boolean sequence; making a decision on the entropy detection result and the cepstrum detection result by using a preset strategy to obtain a decision result; and outputting the decision result as the detection result.

Example 4 performing a power detection on the framed second processing signal to output a power detection result with a Boolean sequence, using the power detection result as an enable signal performing an entropy detection on the framed second processing signal; using the entropy detection result as an enable signal performing a cepstrum detection on the framed second processing signal, outputting a cepstrum detection result with a Boolean sequence after the cepstrum detection as the detection result; or synchronously performing the power detection, the entropy detection and the cepstrum detection on the framed second processing signal, and synchronously obtaining the power detection result with a Boolean sequence, the entropy detection result with a Boolean sequence and the cepstrum detection result with a Boolean sequence; making a decision on the power detection result, the entropy detection result and the cepstrum detection result by using a preset strategy to obtain a decision result; and outputting the decision result as the detection result.

In the above-mentioned technical solutions, the voice activity detection method combines the power detection method, the entropy detection method, and the cepstrum detection method, and hierarchical enable calculation is adopted, and the amount of the calculation increases hierarchically. In addition, it is capable of synchronously performing the power detection and the entropy detection, or synchronously performing the power detection and the cepstrum detection, or synchronously performing the power detection, the entropy detection and the cepstrum detection. Making decisions on the power detection result, the entropy detection result and the cepstrum detection result by using preset strategies, respectively, to obtain a corresponding decision result; and outputting the decision result as the detection result. Wherein, the respective preset strategy decisions are pre-configured according to specific applications, so details will not be repeated herein.

Furthermore, with the voice activity detection method provided by the technical solutions of the present invention adopted, the voice processing unit 3 with large power consumption is made to be in a sleep state for a long time, and therefore, the entire system can be kept in a low-power consumption state; the voice activity detection method is low in implementation cost and can obtain better performance with a small amount of calculation and less resource consumption.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A voice activity detection method, comprising:
providing an acquisition unit for acquiring an external sound signal;
providing a judgment unit for judging whether the sound signal is a voice signal;
if the sound signal is a voice signal, starting a voice processing unit for processing the sound signal;
if the sound signal is not a voice signal, the voice processing unit is kept in a sleep state,
wherein providing a judgment unit for judging whether the sound signal is a voice signal comprises the steps of:
Step S1, reducing a sampling frequency of the sound signal, to obtain a first processing signal;
Step S2, performing a high-pass filtering on the first processing signal, to obtain a second processing signal;
Step S3, framing the second processing signal at a preset time interval;
Step S4, detecting the framed second processing signal for obtaining a detection result that whether the sound signal is the voice signal;
processing the detection result into an activation signal and outputting the activation signal to the voice processing unit;
wherein detecting the framed second processing signal comprises performing a power detection on the framed second processing signal, to output a power detection result with a Boolean sequence as the detection result;
wherein detecting the framed second processing signal comprises performing entropy detection on the framed second processing signal, to output an entropy detection result with a Boolean sequence as the detection result;
wherein detecting the framed second processing signal comprises:
performing a power detection on the framed second processing signal to output a power detection result with a Boolean sequence, using the power detection result as an enable signal performing an entropy detection on the framed second processing signal, outputting an entropy detection result with a Boolean sequence after the entropy detection as the detection result; or
synchronously performing the power detection and the entropy detection on the framed second processing signal, and synchronously obtaining the power detection result with a Boolean sequence and the entropy detection result with a Boolean sequence;
making a decision on the power detection result and the entropy detection result by using a preset strategy to obtain a decision result; and
outputting the decision result as the detection result.

2. The voice activity detection method of claim 1, wherein detecting the framed second processing signal comprises performing a cepstrum detection on the framed second processing signal, to output a cepstrum detection result with a Boolean sequence as the detection result.

3. The voice activity detection method of claim 2, wherein detecting the framed second processing signal comprises:
performing a power detection on the framed second processing signal to output a power detection result with a Boolean sequence, using the power detection result as an enable signal performing a cepstrum detection on the framed second processing signal, output a cepstrum detection result with a Boolean sequence after the cepstrum detection as the detection result; or
synchronously performing the power detection and the cepstrum detection on the framed second processing signal, and synchronously obtaining the power detection result with a Boolean sequence and the cepstrum detection result with a Boolean sequence;
making a decision on the power detection result and the cepstrum detection result by using a preset strategy to obtain a decision result; and outputting the decision result as the detection result.

4. The voice activity detection method of claim 3, wherein detecting the framed second processing signal comprises:
performing an entropy detection on the framed second processing signal to output an entropy detection result with a Boolean sequence, using the entropy detection result as an enable signal performing a cepstrum detection on the framed second processing signal, outputting a cepstrum detection result with a Boolean sequence after the cepstrum detection as the detection result; or
synchronously performing the entropy detection and the cepstrum detection on the framed second processing signal, and synchronously obtaining the entropy detection result with a Boolean sequence and the cepstrum detection result with a Boolean sequence; making a decision on the entropy detection result and the cepstrum detection result by using a preset strategy to obtain a decision result; and outputting the decision result as the detection result.

5. The voice activity detection method of claim 4, wherein detecting the framed second processing signal comprises:
performing a power detection on the framed second processing signal to output a power detection result with a Boolean sequence, using the power detection result as an enable signal performing entropy detection on the framed second processing signal; using the entropy detection result as an enable signal performing cepstrum detection on the framed second processing signal, outputting a cepstrum detection result with a Boolean sequence after the cepstrum detection as the detection result; or
synchronously performing the power detection, the entropy detection and the cepstrum detection on the framed second processing signal, and synchronously obtaining the power detection result with a Boolean sequence, the entropy detection result with a Boolean sequence and the cepstrum detection result with a Boolean sequence; making a decision on the power detection result, the entropy detection result and the cepstrum detection result by using a preset strategy to obtain a decision result; and outputting the decision result as the detection result.

6. The voice activity detection method of claim 1, wherein in Step S4, processing the detection result into the activation signal comprises smoothing each of frames of the detection result.

7. The voice activity detection method of claim 1, wherein in Step S3, the second processing signal is framed by the following formula:

$$\text{frame}(n,m) = y\_emp(f_s * t * n + m);$$

wherein
frame(n,m) represents each of frames of the second processing signal after the framing operation;
y_emp represents the second processing signal;
$f_s$ represents the sampling frequency of the sound signal;
t represents the preset time interval;
n represents the $n^{th}$ frame; and
m represents the $m^{th}$ point in the $n^{th}$ frame.

8. The voice activity detection method of claim 5, wherein the power detection result is performed by the following formula:

$$\text{flag\_pow}(n) = \begin{cases} 1 & avgPow(n) > avgPowold(n) * thresh1 \\ 0 & others \end{cases}$$

wherein
flag_pow(n) represents the power detection result;
avgPow(n) represents an average power of a current frame;
avgPowOld(n) represents an average power of a previous frame; and
thresh1 represents an adjusting parameter.

9. The voice activity detection method of claim 8, wherein a value of thresh1 is in a range from 3 to 100.

10. The voice activity detection method of claim 8, wherein the average power of the current frame is obtained by the following formula:

$$avgPow(n) = \sum_{m=0}^{framelen-1} abs(frame(n,m))^2; \text{ and/or}$$

$$avgPowOld(n) = \frac{1}{avglen} \sum_{i=1}^{avglen} avgPow(n-i);$$

wherein,
frame(n,m) represents each of the frames of the second processing signal after the framing operation;
avgPow(n) represents an average power of a current frame;
framelen represents a length of each of the frames;
avgPowOld(n) represents an average power of a previous frame; and
avglen represents the number of frames currently sampled.

11. The voice activity detection method of any one of claim 5, wherein the entropy detection result is performed by the following formula:

$$\text{flag\_sen}(n) = \begin{cases} 1 & H(n) > thresh2 \\ 0 & others \end{cases};$$

wherein
flag_sen(n) represents the entropy detection result;
H(n) represents an entropy function of the framed second processing signal; and
thresh2 represents a threshold value of entropy judgment.

12. The voice activity detection method of claim 11, wherein a value of thresh2 is in a range from −7 to 0.

13. The voice activity detection method of claim 11, wherein the entropy function of the framed second processing signal is obtained by the following formula:

$$H(n) = \sum_{m=0}^{framelen-1} prob(n,m) * \log_2(prob(n,m)); \text{ and/or}$$

$$prob(n,m) = \frac{Ypow(n,m)}{\sum_{m=0}^{framelen-1} Ypow(n,m)};$$

$$Ypow(n,m) = abs(Y(n,m))^2;$$

$$Y(n,m) = FFT(xw(n,m));$$

$$xw(n,m) = frame(n,m) * win(m);$$

wherein
H(n) represents the entropy function of the framed second processing signal;
win(m) represents a window function;
xw(n,m) represents a signal obtained by windowing the framed second processing signal;
Y(n,m) represents a signal obtained by performing a fast Fourier transform on xw(n,m);
Ypow(n,m) represents a power spectrum of xw(n,m); and
prob(n,m) represents the probability of Ypow(n,m).

14. The voice activity detection method of any one of claim 5, wherein the cepstrum detection result is performed by the following formula:

$$\text{flag\_ceps}(n) = \begin{cases} 1 & tmax(n) - tmin(n) > thresh3 \\ 0 & others \end{cases};$$

$$tmax(n) - max(ceps(n, speech\_range));$$

$$tmin(n) - min(ceps(n, speech\_range));$$

$$ceps(n,m) = IFFT(Ypow\_log(n,m));$$

$$Ypow\_log(n,m) = \log_2(Ypow(n,m));$$

wherein
flag_ceps(n) represents the cepstrum detection result;
Ypow(n,m) represents a power spectrum of xw(n,m);
xw(n,m) represents a signal obtained by windowing the framed second processing signal;
Ypow_log(n,m) represents the cepstrum of xw(n,m);
ceps(n,m) represents a signal obtained by performing an inverse fast Fourier transform on Ypow_log(n,m);
t max(n) represents a maximum value of the current value of ceps(n,m) in a human speech output segment;
t min(n) represents a minimum value of the current value of ceps(n,m) in the human speech output segment;
speech_range represents a range of the human speech output segment;
thresh3 represents a threshold value of the cepstrum judgment.

15. The voice activity detection method of claim 14, wherein a value of thresh3 is in a range from 0.5 to 1.5.

* * * * *